(12) United States Patent
Sakamoto

(10) Patent No.: US 12,446,343 B2
(45) Date of Patent: Oct. 14, 2025

(54) SOLID-STATE IMAGING DEVICE AND ELECTRONIC EQUIPMENT

(71) Applicant: SONY SEMICONDUCTOR SOLUTIONS CORPORATION, Kanagawa (JP)

(72) Inventor: Michiko Sakamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 609 days.

(21) Appl. No.: 17/754,315

(22) PCT Filed: Jun. 29, 2020

(86) PCT No.: PCT/JP2020/025481
§ 371 (c)(1),
(2) Date: Mar. 30, 2022

(87) PCT Pub. No.: WO2021/070431
PCT Pub. Date: Apr. 15, 2021

(65) Prior Publication Data
US 2022/0415944 A1    Dec. 29, 2022

(30) Foreign Application Priority Data
Oct. 7, 2019    (JP) ................. 2019-184592

(51) Int. Cl.
H10F 39/00     (2025.01)
H10F 39/18     (2025.01)

(52) U.S. Cl.
CPC ....... H10F 39/8057 (2025.01); H10F 39/182 (2025.01); H10F 39/8053 (2025.01); H10F 39/8063 (2025.01)

(58) Field of Classification Search
CPC ......... H01L 27/14623; H01L 27/14621; H01L 27/14627; H01L 27/14645; H01L 27/146;
(Continued)

(56) References Cited

U.S. PATENT DOCUMENTS

2006/0006438 A1* 1/2006 Maruyama ........ H01L 27/14601
                                                      257/292
2006/0192883 A1   8/2006 Katsuno et al.
(Continued)

FOREIGN PATENT DOCUMENTS

CN          1682375 A      10/2005
CN        101015062 A       8/2007
(Continued)

OTHER PUBLICATIONS

Machine Translation of JP-2002026304 (Year: 2002).*
(Continued)

Primary Examiner — Julia Slutsker
(74) Attorney, Agent, or Firm — CHIP LAW GROUP

(57) ABSTRACT

A solid-state imaging device includes a pixel unit which further includes a plurality of unit pixels in a two-dimensional array. The plurality of unit pixels are configured to include a plurality of photoelectric conversion units and a plurality of microlenses, where the plurality of photoelectric conversion units generates signal charges corresponding to the amount of incident light, one microlens is for one photoelectric conversion unit group among a plurality of photoelectric conversion unit groups, and the plurality of microlenses guides the incident light to each of the plurality of the photoelectric conversion unit groups. In addition, the solid-state imaging device includes a plurality of light-absorbing layers between the plurality of microlenses and a substrate, and the plurality of light-absorbing layers absorbs a portion of the incident light guided to the plurality of
(Continued)

photoelectric conversion unit groups by the plurality of microlenses.

14 Claims, 13 Drawing Sheets

(58) Field of Classification Search
CPC .... H01L 27/1462; H04N 25/70; H04N 25/11; H04N 25/75
See application file for complete search history.

(56) References Cited

U.S. PATENT DOCUMENTS

| | | | |
|---|---|---|---|
| 2013/0075591 | A1 | 3/2013 | Otake |
| 2015/0076643 | A1 | 3/2015 | Kikuchi |
| 2015/0346547 | A1 | 12/2015 | Wakabayashi |
| 2016/0358963 | A1* | 12/2016 | Kikuchi ............ H01L 27/14621 |
| 2021/0006756 | A1* | 1/2021 | Sato ................ H01L 27/14623 |

FOREIGN PATENT DOCUMENTS

| | | |
|---|---|---|
| CN | 103545335 A | 1/2014 |
| CN | 104465681 A | 3/2015 |
| CN | 105938841 A | 9/2016 |
| CN | 108028259 A | 5/2018 |
| CN | 109474771 A | 3/2019 |
| DE | 102013221741 A1 | 4/2015 |
| EP | 1403696 A1 | 3/2004 |
| JP | 2002-026304 A | 1/2002 |
| JP | 2004-134790 A | 4/2004 |
| JP | 2006-237315 A | 9/2006 |
| JP | 2012038768 A | 2/2012 |
| JP | 2013-157442 A | 8/2013 |
| JP | 2013-211413 A | 10/2013 |
| JP | 2015-060855 A | 3/2015 |
| JP | 2015082510 A | 4/2015 |
| JP | 2019-175912 A | 10/2019 |
| KR | 10-2005-0057378 A | 6/2005 |
| KR | 10-2006-0094877 A | 8/2006 |
| TW | 200425488 A | 11/2004 |
| WO | 2004/027875 A1 | 4/2004 |
| WO | 2019/188123 A1 | 10/2019 |

OTHER PUBLICATIONS

Machine Translation of JP-2013157442 (Year: 2013).*
Machne Translation of JP-201321413 (Year: 2013).*
International Search Report and Written Opinion of PCT Application No. PCT/JP2020/025481, issued on Sep. 24, 2020, 12 pages of ISRWO.
Luo Yi, et al, "Optics in Solid State Lighting", Acta Optica Sinica, vol. 31, No. 09, Sep. 10, 2011, pp. 0900117-1-0900117-11.
S.M.Thahab, et al, "Simulation of InGaN multiple quantum wells (MQWs) light emitting diodes (LEDs)", IEEE International Conference on Semiconductor Electronics, Jan. 1, 2006, pp. 1034-1037.
Yu Haihua, et al, "Influenceof temperature on the properties of CIGS absorbing layers in H2Se selenization process", Acta Energiae Solaris Sinica, No. 09, Sep. 28, 2016, pp. 2363-2369.

* cited by examiner

SOLID-STATE IMAGING DEVICE AND ELECTRONIC EQUIPMENT

CROSS REFERENCE TO RELATED APPLICATIONS

This application is a U.S. National Phase of International Patent Application No. PCT/JP2020/025481 filed on Jun. 29, 2020, which claims priority benefit of Japanese Patent Application No. JP 2019-184592 filed in the Japan Patent Office on Oct. 7, 2019. Each of the above-referenced applications is hereby incorporated herein by reference in its entirety.

TECHNICAL FIELD

The present technology relates to a solid-state imaging device and electronic equipment.

BACKGROUND ART

In the related art, as a structure in which two adjacent photoelectric conversion units share one microlens, a solid-state imaging device that can calculate a distance to a subject on the basis of signal charges generated by the two photoelectric conversion units has been proposed (see, for example, PTL 1). In the solid-state imaging device disclosed in PTL 1, a scatterer is provided at a location where a microlens collects light, so that the collected light is scattered by the scatterer and distributed to two adjacent photoelectric conversion units. In addition, a difference in light-receiving sensitivity between the photoelectric conversion units due to misalignment during manufacturing is suppressed.

CITATION LIST

Patent Literature

[PTL 1]
JP 2013-211413 A

SUMMARY

Technical Problem

However, in the solid-state imaging device disclosed in PTL 1, light is distributed by the scatterer, and thus scattered light infiltrates into the surrounding photoelectric conversion units, which results in a possibility that optical color mixing will occur. For this reason, there is a possibility that the quality of an image obtained by the solid-state imaging device will be degraded.

An object of the present disclosure is to provide a solid-state imaging device and electronic equipment which are capable of obtaining an image with higher quality.

Solution to Problem

A solid-state imaging device of the present disclosure includes (a) a pixel unit which is configured such that a plurality of unit pixels are disposed in a two-dimensional array, the plurality of unit pixels being configured to include a plurality of photoelectric conversion units and a plurality of microlenses, the plurality of photoelectric conversion units being formed on a substrate and generating signal charges corresponding to the amount of incident light, and the plurality of microlenses being configured such that one microlens is formed for one photoelectric conversion unit group among a plurality of photoelectric conversion unit groups each of which is constituted by at least two or more adjacent photoelectric conversion units insulated from each other by an impurity layer, and guiding the incident light to each of the plurality of photoelectric conversion unit groups, and (b) a plurality of light-absorbing layers that are formed between the microlenses and the substrate and absorb a portion of the incident light guided to the photoelectric conversion unit groups by the microlenses.

In addition, electronic equipment of the present disclosure includes (a) a solid-state imaging device including a pixel unit and a plurality of light-absorbing layers, the pixel unit being configured such that a plurality of unit pixels are disposed in a two-dimensional array, the plurality of unit pixels being configured to include a plurality of photoelectric conversion units and a plurality of microlenses, the plurality of photoelectric conversion units being formed on a substrate and generating signal charges corresponding to the amount of incident light, and the plurality of microlenses being configured such that one microlens is formed for one photoelectric conversion unit group among a plurality of photoelectric conversion unit groups each of which is constituted by at least two or more adjacent photoelectrit groups in which the photoelectric conversion units are insulated from each other by an impurity layer, and guiding the incident light to each of a plurality of the photoelectric conversion unit groups, and the plurality of light-absorbing layers being formed between the microlenses and the substrate and absorbing a portion of the incident light guided to the photoelectric conversion unit groups by the microlenses, (b) an optical lens which forms an image of image light from a subject on an imaging surface of the solid-state imaging device, and (c) a signal processing circuit which performs signal processing on a signal output from the solid-state imaging device.

DESCRIPTION OF EMBODIMENTS

Hereinafter, examples of a solid-state imaging device 1 and electronic equipment according to an embodiment of the present disclosure will be described with reference to FIGS. 1 to 16. The embodiment of the present disclosure will be described in the following order. Note that the present disclosure is not limited to the following examples. In addition, the effects described in the present specification are merely illustrative and not restrictive, and other effects may be obtained.

Figure 1:
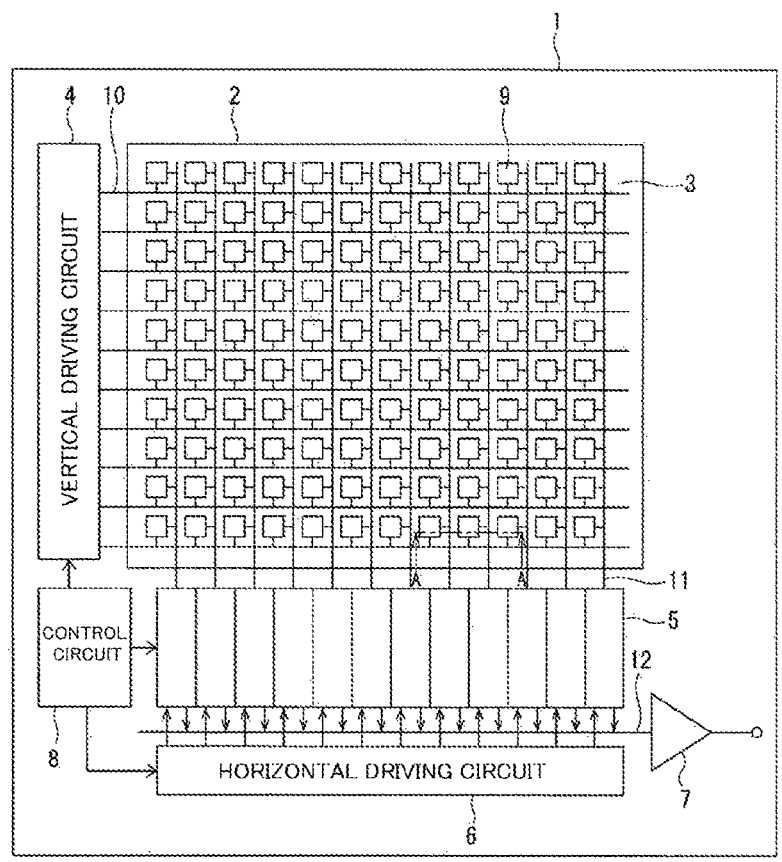
FIG. 1 is a diagram illustrating the overall configuration of a solid-state imaging device according to a first embodiment of the present disclosure.
Figure 16:
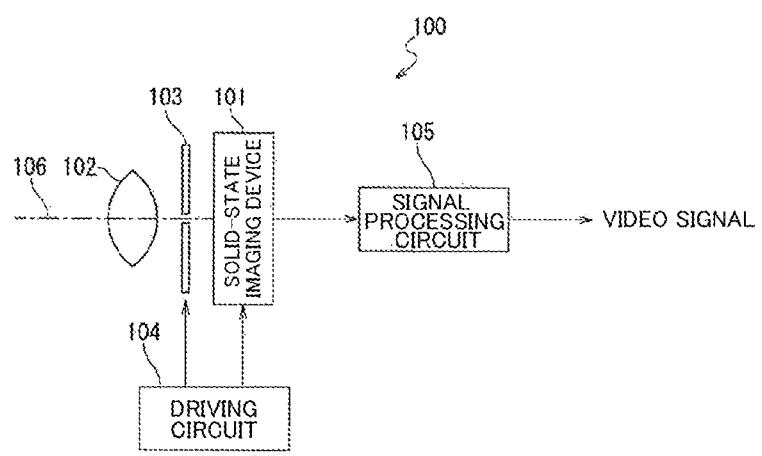
FIG. 16 is a diagram illustrating planar configurations of the color filter and the light-absorbing layer of the solid-state imaging device according to the modification example.

1. First Embodiment: Solid-State Imaging Device
1-1 Overall Configuration of Solid-State Imaging Device
1-2 Configurations of Main Parts
1-3 Method of Manufacturing light-Absorbing Layer
1-4 Modification Example
2. Second Embodiment: Electronic Equipment 1. First Embodiment 1-1 Overall Configuration of Solid-State Imaging Device The solid-state imaging device 1 according to the first embodiment of the present disclosure will be described. FIG. 1 is a schematic configuration diagram illustrating the entire solid-state imaging device 1 according to the first embodiment of the present disclosure The solid-state imaging device 1 in FIG. 1 is a backside irradiation type complementary metal oxide semiconductor (CMOS) image sensor. As illustrated in FIG. 16, the solid-state imaging device 1 (101) takes in image light (incident light 106) from a subject through an optical lens 102, converts the amount of incident light 106 imaged on an imaging surface into an electrical signal in units of pixels, and outputs the electrical signal as a pixel signal.

As illustrated in FIG. 1, the solid-state imaging device 1 according to the first embodiment includes a substrate 2, a pixel region 3, a vertical driving circuit 4, column signal processing circuits 5, a horizontal driving circuit 6, an output circuit 7, and a control circuit 8.

The pixel region 3 includes a plurality of pixels 9 arranged regularly in a two-dimensional array on the substrate 2. The pixel 9 includes a photoelectric conversion unit 21 illustrated in FIG. 2, and a plurality of pixel transistors (not illustrated). As the plurality of pixel transistors, for example, four transistors, that is, a transfer transistor, a reset transistor, a selection transistor, and an amplifier transistor can be adopted. In addition, for example, the three transistors except for the selection transistor may be adopted.

The vertical driving circuit 4, which is constituted by, for example, a shift register, selects a desired pixel driving wiring 10, supplies a pulse for driving the pixels 9 to the selected pixel driving wiring 10, and drives the pixels 9 in units of rows. That is, the vertical driving circuit 4 sequentially performs selection scanning on the pixels 9 in the pixel region 3 in a vertical direction in units of rows, and supplies a pixel signal based on signal charges generated in accordance with the amount of light received in the photoelectric conversion unit 21 of each of the pixels 9 to the column signal processing circuit 5 through vertical signal lines 11.

The column signal processing circuit 5 is disposed, for example, for each column of the pixel 9, and performs signal processing such as noise removal for each pixel column on a signal which is output from the pixels 9 corresponding to one row. For example, the column signal processing circuit 5 performs signal processing such as correlated double sampling (CDS) and analog digital (AD) conversion for removing pixel-specific fixed pattern noise.

The horizontal driving circuit 6, which is constituted by, for example, a shift register, sequentially outputs a horizontal scanning pulse to the column signal processing circuits 5 to select each of the column signal processing circuits 5 in order, and outputs a pixel signal having been subjected to signal processing to the horizontal signal line 12 from each of the column signal processing circuits 5.

The output circuit 7 performs signal processing on pixel signals sequentially supplied and outputs the pixel signals through the horizontal signal line 12 from each of the column signal processing circuits 5. Examples of the signal processing which may be used include buffering, black level adjustment, array variation correction, various digital signal processing, and the like.

The control circuit 8 generates a clock signal or a control signal as a reference for operations of the vertical driving circuit 4, the column signal processing circuit 5, the horizontal driving circuit 6, and the like on the basis of a vertical synchronization signal, a horizontal synchronization signal, and a master clock signal. In addition, the control circuit 8 outputs the generated clock signal or control signal to the vertical driving circuit 4, the column signal processing circuit 5, the horizontal driving circuit 6, and the like.

1-2 Configurations of Main Parts

Figure 2:
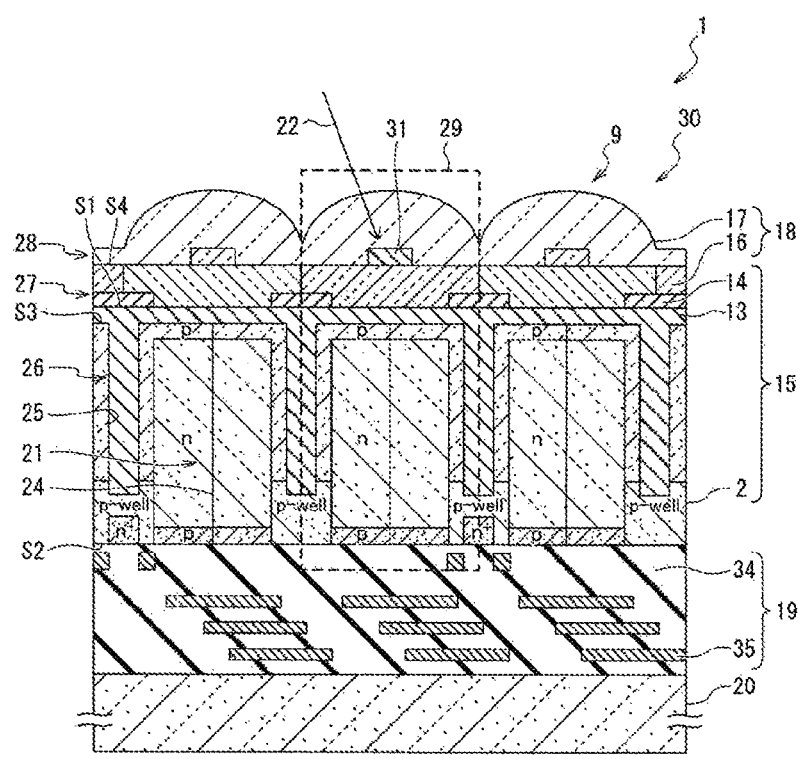
FIG. 2 is a diagram illustrating a cross-sectional configuration of a pixel region along line A-A in FIG. 1.

Next, a detailed configuration of the solid-state imaging device 1 in FIG. 1 will be described. FIG. 2 is a diagram illustrating a cross-sectional configuration of the pixel region 3 of the solid-state imaging device 1 according to the first embodiment. In FIG. 2, a backside irradiation type CMOS image sensor (CMOS type solid-state imaging device) is used as the solid-state imaging device 1.

As illustrated in FIG. 2, the solid-state imaging device 1 according to the first embodiment includes a light receiving layer 15 in which the substrate 2, an insulating film 13, and a light shielding film 14 are laminated in this order. In addition, a light collecting layer 18 in which a color filter 16 and a microlens 17 (an on-chip lens, a wafer lens) are laminated in this order is formed on a surface of the light receiving layer 15 on the insulating film 13 side (hereinafter, also referred to as a "rear surface S1"). Further, a wiring layer 19 and a supporting substrate 20 are laminated in this order on a surface of the light receiving layer 15 on the substrate 2 side (hereinafter, also referred to as a "surface S2"). Meanwhile, the rear surface S1 of the light receiving layer 15 and the rear surface of the insulating film 13 are the same surface, and thus the rear surface of the insulating film 13 will be referred to as a "rear surface S1" in the following description. In addition, the surface S2 of the light receiving layer 15 and the surface of the substrate 2 are the same surface, and thus the surface of the substrate 2 will be referred to as a "surface S2" in the following description.

The substrate 2 is constituted by a semiconductor substrate formed of, for example, silicon (Si), and forms the pixel region 3 as illustrated in FIG. 1. As illustrated in FIG. 2, a plurality of photoelectric conversion units 21 formed on the substrate 2, that is, the plurality of pixels 9 configured to include the plurality of photoelectric conversion units 21 embedded into the substrate 2 are disposed in a two-dimensional array in the pixel region 3. In the photoelectric conversion unit 21, signal charges corresponding to the amount of incident light 22 are generated, and the generated signal charges are accumulated.

Figure 3A:
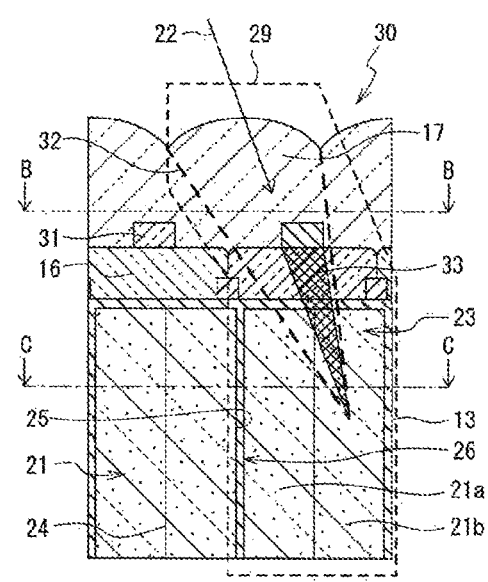
FIG. 3A is an enlarged view illustrating a cross-sectional configuration of the pixel region.
Figure 3B:
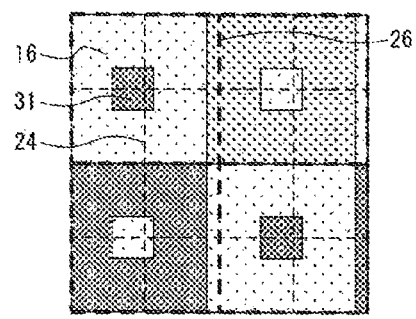
FIG. 3B is a diagram illustrating planar configurations of a color filter and a light-absorbing layer along line B-B in FIG. 3A.
Figure 3C:
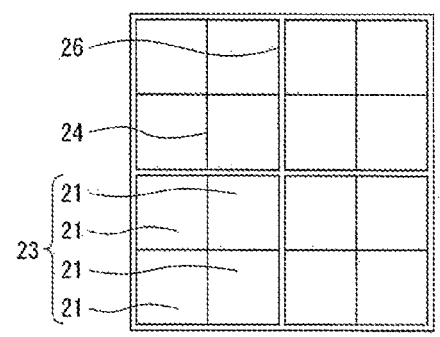
FIG. 3C is a diagram illustrating planar configurations of a photoelectric conversion unit group and a photoelectric conversion unit along line C-C in FIG. 3A.
Figure 4A:
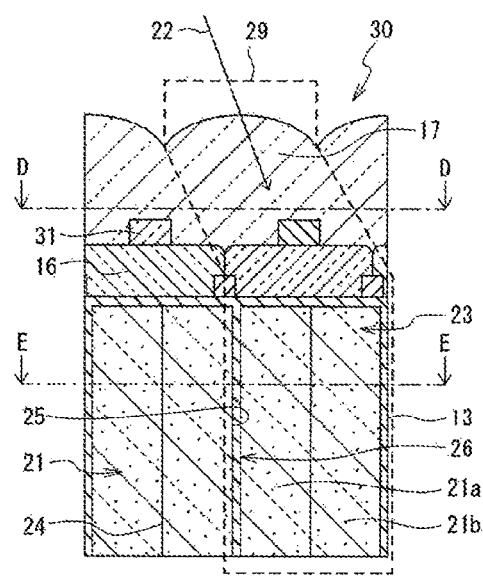
FIG. 4A is an enlarged view illustrating a cross-sectional configuration of the pixel region.
Figure 4B:
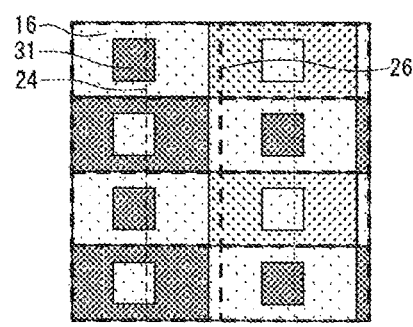
FIG. 4B is a diagram illustrating planar configurations of the color filter and the light-absorbing layer along line D-D in FIG. 4A.
Figure 4C:
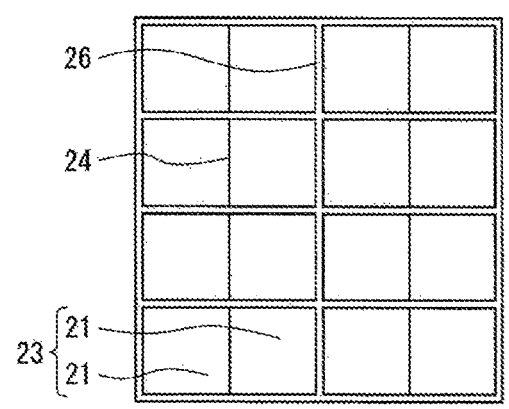
FIG. 4C is a diagram illustrating planar configurations of the photoelectric conversion unit group and the photoelectric conversion unit along line E-E in FIG. 4A.

Regarding the photoelectric conversion unit 21, at least two or more adjacent photoelectric conversion units 21 constitute a photoelectric conversion unit group 23 as illustrated in FIGS. 3A, 3B, 3C, 4A, 4B, and 4C. In FIGS. 3A, 3B, and 3C, a photoelectric conversion unit group 23 constituted by four photoelectric conversion units 21 is illustrated. Further, in FIGS. 4A, 4B, and 4C, a photoelectric conversion unit group 23 constituted by two photoelectric conversion units 21 is illustrated. Pupil correction to be described later is performed on the color filter 16 and the microlens 17 illustrated in FIG. 3A. An impurity layer 24 formed by implanting impurities into the substrate 2 is formed between the photoelectric conversion units 21 constituting the photoelectric conversion unit group 23. As the impurities, for example, a material that electrically separates the photoelectric conversion units 21 and enables the impurity layer 24 to transmit incident light 22 can be used. For example, elements such as phosphorus, arsenic, and boron can be adopted.

In addition, a groove portion 25 formed in a depth direction from the surface of the substrate 2 on the insulating film 13 side (hereinafter, also referred to as a "rear surface S3") and an inter-pixel light shielding portion 26 which is configured to include the insulating film 13 filled into the groove portion 25 are formed between the photoelectric conversion unit groups 23 so that the photoelectric conversion unit groups 23 are physically separated from each other.

The insulating film 13 continuously covers the entire substrate 2 on the rear surface S3 side (the entirety on a light receiving surface side). In addition, the light shielding film 14 is formed in a lattice shape in a portion of the insulating film 13 on the rear surface S1 side (a portion on a light receiving surface side) so that a light receiving surface of each of the plurality of photoelectric conversion unit groups 23 is open.

The color filter 16 is formed to correspond to each of the photoelectric conversion unit groups 23 on the rear surface S1 side (light receiving surface side) of the insulating film 13. Thereby, the color filters 16 form color filter arrays 27 that are regularly arranged in a two-dimensional array. Each of the color filters 16 is configured to transmit a specific wavelength of incident light 22, such as red, green, or blue, which is desired to be received by the photoelectric conversion unit group 23. In addition, the color filter 16 transmits incident light 22 having a specific wavelength and makes the transmitted incident light 22 incident on the photoelectric conversion unit 21 of the substrate 2.

Figure 5A:
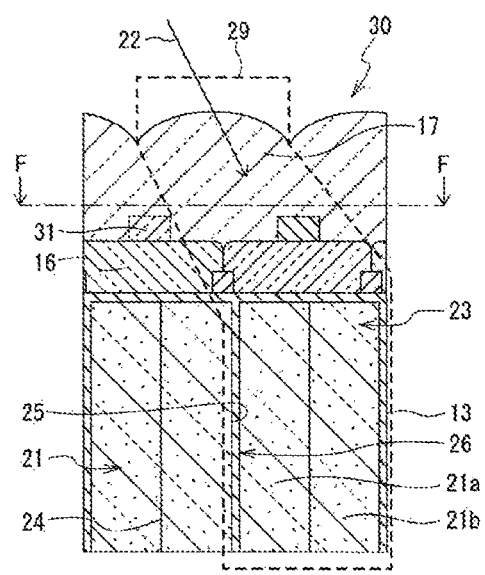
FIG. 5A is an enlarged view illustrating a cross-sectional configuration of the pixel region.

In addition, so-called pupil correction is performed on each of the color filters 16 as illustrated in FIGS. 3A and 5A. In the pupil correction, the central portion of the color filter 16 when seen in a plan view is shifted to the central portion side of the pixel region 3 (pixel unit 30 to be described later) from the center of the photoelectric conversion unit group 23 corresponding to the color filter 16 toward the outer peripheral portion of the pixel region 3 (pixel unit 30) from the central portion thereof. FIG. 5A illustrates the color filter 16 and the like that are formed on the outer peripheral portion side of the pixel region 3, as compared to the color filter 16 and the like illustrated in FIG. 3A. Through the pupil correction performed on the color filter 16, oblique incident light 22 which is incident on the photoelectric conversion unit 21 can pass through the color filter 16 through the microlens 17 in the outer peripheral portion of the pixel region 3 (pixel unit 30).

The microlens 17 is formed to correspond to each of the photoelectric conversion unit groups 23 on the rear surface S4 side (light receiving surface side) of the color filter 16. That is, one microlens 17 is formed for one of the plurality of photoelectric conversion unit groups 23. Thereby, the microlenses 17 form microlens arrays 28 that are regularly arranged in a two-dimensional array. Each of the microlenses 17 is configured to collect incident light 22 and guide the collected incident light 22 to each of the plurality of photoelectric conversion units 21 through the color filter 16.

In addition, so-called pupil correction is performed on each of the microlenses 17 as illustrated in FIGS. 3A and 5A. In the pupil correction, the central portion of the microlens 17 when seen in a plan view is shifted to the central portion side of the pixel region 3 (pixel unit 30) from the center of the photoelectric conversion unit group 23 corresponding to the microlens 17 toward the outer peripheral portion of the pixel region 3 (pixel unit 30) from the central portion thereof. Through the pupil correction performed on the microlens 17, oblique incident light 22 incident on the microlens 17 can incident on the photoelectric conversion unit 21 in the outer peripheral portion of the pixel region 3 (pixel unit 30).

A configuration including one photoelectric conversion unit group 23 and one microlens 17 is regarded as a unit pixel 29, and the unit pixels 29 are arranged in a two-dimensional array to constitute the pixel unit 30.

In this manner, when a structure in which one microlens 17 is shared by at least two or more adjacent photoelectric conversion units 21 (photoelectric conversion unit group 23) is adopted, there is a difference between signal charges generated by the respective photoelectric conversion units 21 included in the same photoelectric conversion unit group 23. For this reason, in the solid-state imaging device 1 according to the first embodiment, a distance to a subject can be calculated on the basis of the difference.

A light-absorbing layer 31 is formed corresponding to each of the photoelectric conversion unit groups 23 between the microlens 17 and the substrate 2 as illustrated in FIGS. 3A, 3B, 5A, 5B, and 6. In FIGS. 3A, 3B, 5A, and 5B, the light-absorbing layer 31 formed on the surface of the color filter 16 on the microlens 17 side is illustrated. Further, in FIG. 6, the light-absorbing layer 31 formed to be embedded in the surface of the color filter 16 on the substrate 2 side is illustrated. Each of the light-absorbing layers 31 is formed of a material that can absorb incident light 22. In addition, the area of the planar shape of the light-absorbing layer 31 is smaller than the area of the planar shape of the color filter 16, that is, the area of the planar shape of the photoelectric conversion unit group 23. By making it smaller than the area of the planar shape of the photoelectric conversion unit group 23, the light-absorbing layer 31 can absorb a portion of incident light 22 guided to the photoelectric conversion unit group 23 by the microlens 17 as illustrated in FIG. 3A. In FIG. 3A, a light path 32 of incident light 22 on the outer periphery side of the microlens 17 among the incident lights 22 guided to the photoelectric conversion unit group 23 by the microlens 17 is indicated by a dashed line. Further, in FIG. 3A, a region 33 in which the incident light 22 is absorbed and weakened by the light-absorbing layer 31 is indicated by halftone dots.

Figure 7:
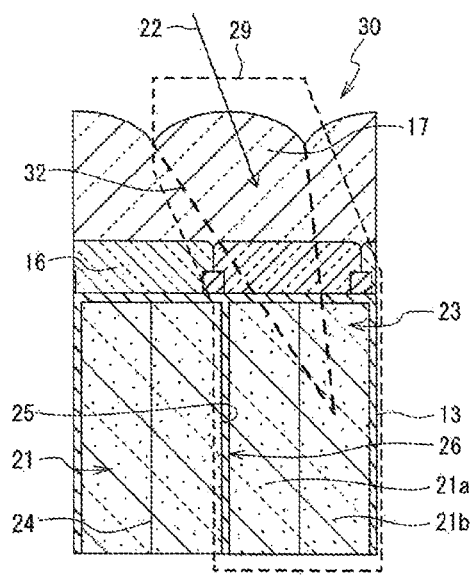
FIG. 7 is an enlarged view illustrating a cross-sectional configuration of a pixel region of a solid-state imaging device in the related art.

Here, the incident light 22 is obliquely incident on the outer peripheral portion of the pixel unit 30. For this reason, in a case where the light-absorbing layer 31 is not formed, the incident light 22 incident on the photoelectric conversion unit 21 on the central portion side of the pixel unit 30 (hereinafter also referred to as a "center-side photoelectric conversion unit 21a") in the photoelectric conversion unit group 23 passes through an impurity layer 24 and is incident on the photoelectric conversion unit 21 on the outer periphery side of the pixel unit 30 (hereinafter also referred to as an "outer periphery-side photoelectric conversion unit 21b") as illustrated in FIG. 7. For this reason, a difference between signal charges generated by the center-side photoelectric conversion unit 21a and the outer periphery-side photoelectric conversion unit 21b increases. Thereby, there is a possibility that a difference between signal charges (same color sensitivity difference) generated by the photoelectric conversion units 21 included in the same photoelectric conversion unit group 23, that is, two or more photoelectric conversion units 21 to which incident light 22 is guided by the same microlens 17 and on which light having the same wavelength (color) is incident will be increased. As a result, there is a possibility that the quality of an image obtained by remosaic processing will be degraded.

As a method of reducing a difference between signal charges, for example, it is also conceivable to separate the photoelectric conversion units 21 included in the same photoelectric conversion unit group 23 by the inter-pixel light shielding portion 26. However, in a case where the photoelectric conversion units 21 are separated by the inter-pixel light shielding portion 26, incident light 22 is scattered in the inter-pixel light shielding portion 26, which results in a possibility that scattered light will infiltrate into the photoelectric conversion units 21 included in another photoelectric conversion unit group 23 and optical color mixing will occur. For this reason, there is a possibility that the quality of an image obtained by the solid-state imaging device 1 will be degraded.

On the other hand, in the solid-state imaging device 1 according to the first embodiment, the light-absorbing layer 31 is provided, and thus it is possible to adopt a configuration in which a portion of incident light 22 having passed through the microlens 17 is absorbed so that a difference between signal charges generated by the respective photoelectric conversion units 21 included in the same photoelectric conversion unit group 23 is reduced. For example, as illustrated in FIGS. 3A and 3B, the amount of incident light 22 which is directly incident on the outer periphery-side photoelectric conversion unit 21b can be reduced by forming the light-absorbing layer 31 in the vicinity of the central portion of the color filter 16, and thus it is possible to reduce a difference between signal charges generated by the center-side photoelectric conversion unit 21a and the outer periphery-side photoelectric conversion unit 21b. Thereby, it is possible to suppress the degradation of the quality of an image obtained by remosaic processing. In addition, for example, the scattering of incident light 22 does not occur unlike a case where the inter-pixel light shielding portion 26 is used, and thus it is possible to prevent optical color mixing.

Figure 8A:
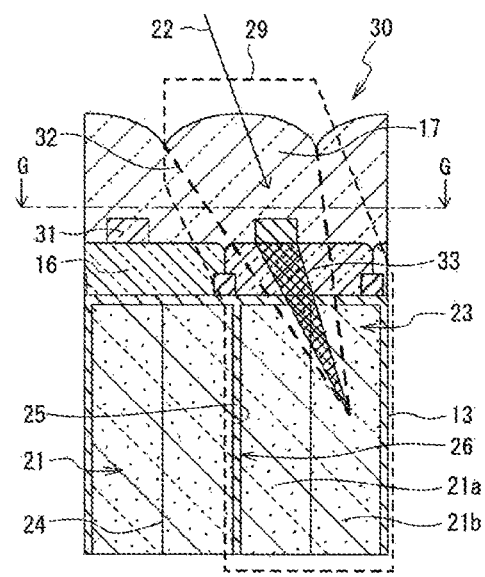
FIG. 8A is an enlarged view illustrating a cross-sectional configuration of the pixel region.

In addition, for example, as illustrated in FIG. 8A, the amount of incident light 22 which is incident on the outer periphery-side photoelectric conversion unit 21b through the center-side photoelectric conversion unit 21a and the impurity layer 24 can be reduced by forming the light-absorbing layer 31 on the central portion side of the pixel unit 30 rather than the central portion of the color filter 16, and thus it is possible to reduce a difference between signal charges generated by the center-side photoelectric conversion unit 21a and the outer periphery-side photoelectric conversion unit 21b.

Figure 5B:
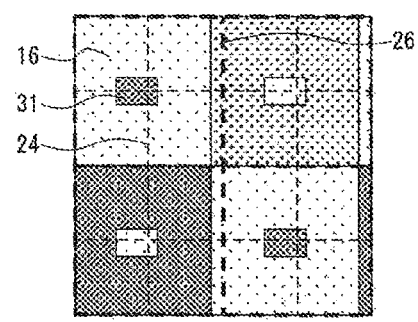
FIG. 5B is a diagram illustrating planar configurations of the color filter and the light-absorbing layer along line F-F in FIG. 5A.
Figure 6:
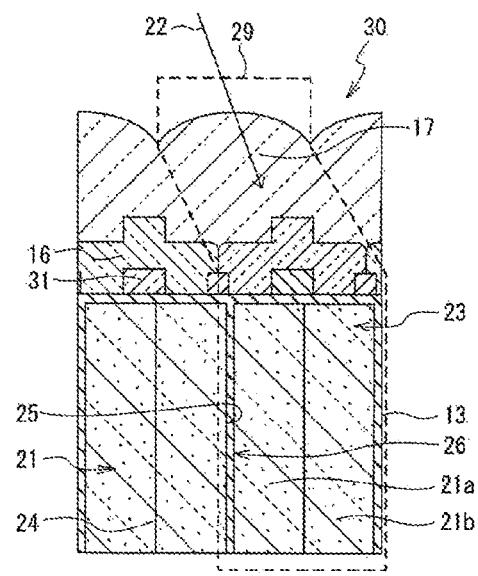
FIG. 6 is an enlarged view illustrating a cross-sectional configuration of the pixel region.

In addition, the position of the light-absorbing layer 31 with respect to the color filter 16 when seen in a plan view becomes closer to the central portion side of the pixel unit 30 as a distance between the unit pixel 29 having the light-absorbing layer 31 formed therein and the central portion of the pixel unit 30 increases, as illustrated in FIGS. 3A, 3B, 5A, and 5B. FIGS. 3A and 3B illustrate a case where a distance between the light-absorbing layer 31 and the central portion of the pixel unit 30 is comparatively short. In addition, FIGS. 5A and 5B illustrate a case where a distance between the light-absorbing layer 31 and the central portion of the pixel unit 30 is comparatively long. For this reason, it is possible to more appropriately absorb incident light 22 which passes through the center-side photoelectric conversion unit 21a and the impurity layer 24 and is incident on the outer periphery-side photoelectric conversion unit 21b among incident light 22 that are obliquely incident on the photoelectric conversion units 21 in the outer peripheral portion of the pixel unit 30, and to reduce a difference between signal charges generated by the center-side photoelectric conversion unit 21a and the outer periphery-side photoelectric conversion unit 21b.

In addition, the planar shape of the light-absorbing layer 31 is a predetermined shape in which the light-absorbing layer 31 becomes longer in a direction parallel to a line passing through the unit pixel 29 and the central portion of the pixel unit 30 as a distance between the unit pixel 29 having the light-absorbing layer 31 formed therein and the central portion of the pixel unit 30 increases, as illustrated in FIGS. 3A, 3B, 5A, and 5B. FIGS. 5A and 5B illustrate the light-absorbing layer 31 that is longer in the above-described direction than the light-absorbing layer 31 illustrated in FIGS. 3A and 3B. For this reason, it is possible to more appropriately absorb incident light 22 which passes through the center-side photoelectric conversion unit 21a and the impurity layer 24 and is incident on the outer periphery-side photoelectric conversion unit 21b among incident light 22 that are obliquely incident on the photoelectric conversion units 21 in the outer peripheral portion of the pixel unit 30, and to reduce a difference between signal charges generated by the center-side photoelectric conversion unit 21a and the outer periphery-side photoelectric conversion unit 21b.

Figure 8B:
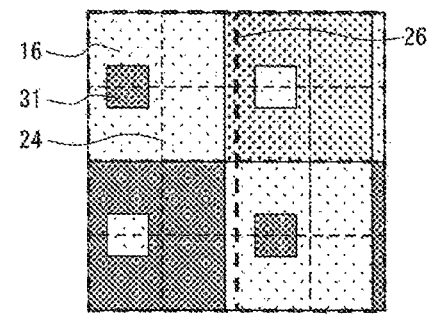
FIG. 8B is a diagram illustrating planar configurations of the color filter and the light-absorbing layer along line G-G in FIG. 8A.
Figure 9A:
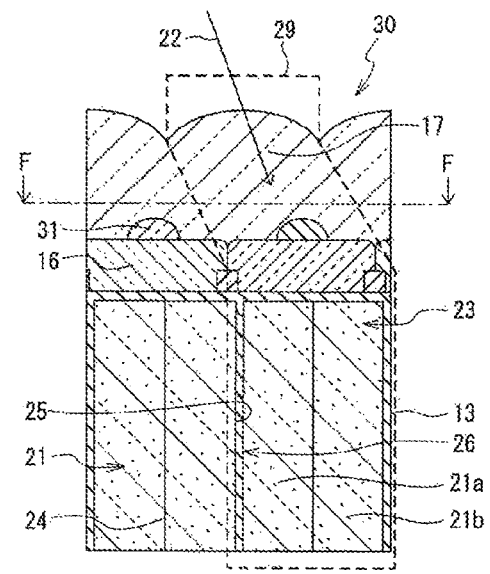
FIG. 9A is an enlarged view illustrating a cross-sectional configuration of the pixel region.
Figure 9B:
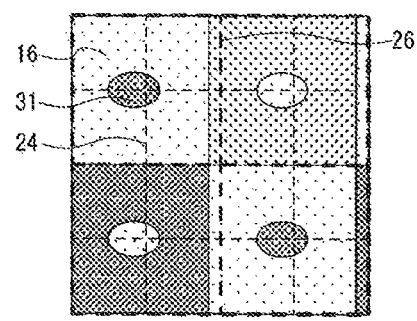
FIG. 9B is a diagram illustrating planar configurations of the color filter and the light-absorbing layer along line H-H in FIG. 9A.

The predetermined shape may be, for example, a rectangular shape as illustrated in FIGS. 3B, 5B, and 8B or an elliptical shape as illustrated in FIGS. 9A and 9B. In a case where a rectangular shape is used, it is possible to facilitate the formation of the light-absorbing layer 31. In addition, light is collected by the microlens 17, and the light-absorbing layer 31 is disposed in the central portion of the color filter 16 having the strongest light intensity, whereby it is possible to suppress a same color sensitivity difference while suppressing a reduction in sensitivity. Here, a cross-sectional shape of oblique incident light 22 generated in the outer peripheral portion of the pixel region 3 is an elliptical shape. For this reason, in a case where an elliptical shape is used as the predetermined shape, it is possible to cover only the central portion of the color filter 16 having the strongest light intensity and minimize a reduction in sensitivity.

In addition, the thickness of the light-absorbing layer 31 may be smaller than the thickness of the color filter 16. It is possible to further reduce a distance between the microlens 17 and the photoelectric conversion unit 21 by reducing the thickness of the light-absorbing layer 31, and it is possible to further miniaturize the solid-state imaging device 1 according to the first embodiment.

In addition, as the material of the light-absorbing layer 31, for example, the same material as that of any one color filter 16 can be used. By using the same material, it is possible to form the light-absorbing layer 31 using, for example, equipment for forming the color filter 16 and easily form the light-absorbing layer 31.

In this case, for example, as illustrated in FIG. 3B, the color filter 16 and the light-absorbing layer 31 formed in the color filter 16 may be formed of different materials. That is, a configuration in which a wavelength region of light passing through the color filter 16 and a wavelength region of light passing through the light-absorbing layer 31 formed in the color filter 16 are different may be adopted. With such a configuration, it is possible to improve a function of absorbing incident light 22 by the light-absorbing layer 31, as compared to a case where the wavelength region of light passing through the color filter 16 and the wavelength region of light passing through the light-absorbing layer 31 are formed of the same material.

Figure 10:
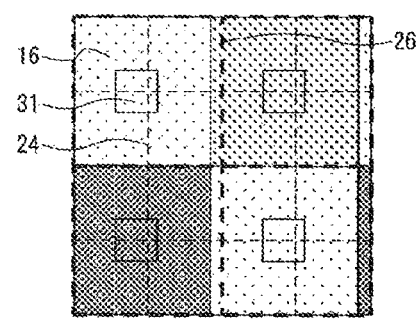
FIG. 10 is a diagram illustrating planar configurations of the color filter and the light-absorbing layer.

In addition, for example, as illustrated in FIG. 10, the color filter 16 and the light-absorbing layer 31 formed in the color filter 16 may be formed of the same material. That is, a configuration in which the wavelength region of light passing through the color filter 16 and the wavelength region of light passing through the light-absorbing layer 31 formed in the color filter 16 are the same may be adopted. With such a configuration, it is possible to form the light-absorbing layer 31 at the time of forming the color filter 16 and to easily form the light-absorbing layer 31.

The wiring layer 19 is formed on the surface S2 side of the substrate 2, and is configured to include wirings 35 laminated as a plurality of layers (three layers in FIG. 2) through an insulating interlayer film 34. A pixel transistor constituting the pixels 9 is driven through the plurality of layers of wirings 35 formed in the wiring layer 19.

The supporting substrate 20 is formed on a surface of the wiring layer 19 on a side opposite to a surface facing the substrate 2. The supporting substrate 20 is a substrate for securing the strength of the substrate 2 at a manufacturing stage of the solid-state imaging device 1. As a material of the supporting substrate 20, for example, silicon (Si) can be used.

In the solid-state imaging device 1 having the above-described configuration, light is emitted from the rear surface side of the substrate 2 (the rear surface S1 side of the light receiving layer 15), the emitted light passes through the microlenses 17 and the color filters 16, and the transmitted light is subjected to photoelectric conversion by the photoelectric conversion units 21, thereby generating signal charges. In addition, the generated signal charges are output as a pixel signal by the vertical signal line 11, illustrated in FIG. 1, which is formed by the wirings 35 through the pixel transistors formed on the surface S2 side of the substrate 2.

In addition, a distance to a subject can be calculated on the basis of a difference between signal charges generated by the respective photoelectric conversion units 21 included in the same photoelectric conversion unit group 23 among the generated signal charges.

1-3 Method of Manufacturing Light-Absorbing Layer

Figure 11:
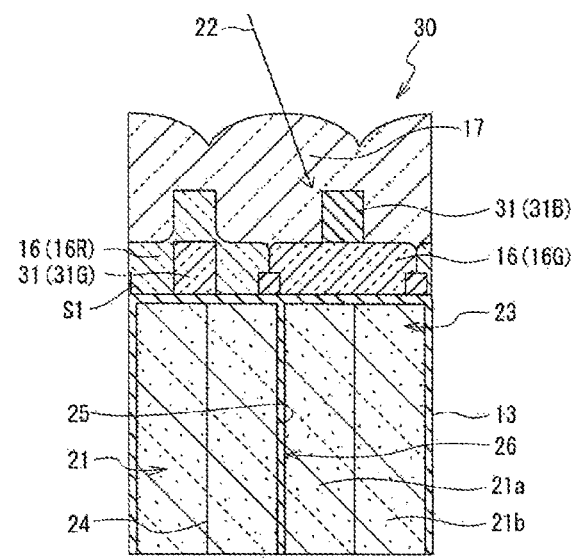
FIG. 11 is an enlarged view illustrating a cross-sectional configuration of the pixel region.

Next, a method of manufacturing the light-absorbing layer 31 of the solid-state imaging device 1 according to the first embodiment will be described. FIG. 11 is a diagram illustrating the pixel region 3 including the light-absorbing layer 31 which is manufactured by the present manufacturing method.

FIG. 11 illustrates a case where the light-absorbing layer 31 formed on the surface of the color filter 16 on the microlens 17 side and the light-absorbing layer 31 formed on the surface thereof on the substrate 2 side are mixed. In addition, the color filter 16 and the light-absorbing layer 31 formed in the color filter 16 are formed of different materials. That is, the light-absorbing layer 31 transmitting a green wavelength (referred to as "31G" in FIG. 11) is formed on the surface of the color filter 16 transmitting a red wavelength (referred to as "16R" in FIG. 11) on the substrate 2 side, and the light-absorbing layer 31 transmitting a blue wavelength (referred to as "31B" in FIG. 11) is formed on the surface of the color filter 16 transmitting a green wavelength (referred to as "16G" in FIG. 11) on the microlens 17 side. In addition, although not illustrated in FIG. 11, the color filter 16G transmitting a green wavelength is formed on the surface of the color filter 16 transmitting a blue wavelength on the substrate 2 side. In addition, the thickness of the light-absorbing layer 31 (31G, 31B) is the same as the thickness of the color filter 16 (16R, 16G).

In the method of manufacturing the light-absorbing layer 31 of the solid-state imaging device 1 according to the first embodiment, first, (1) a color filter resist transmitting a green wavelength is applied onto the entire rear surface S1 of the light receiving layer 15. Next, (2) the color filter resist is irradiated with a UV lamp through a mask in which a hole is formed at a location for forming the color filter 16G and the light-absorbing layer 31G which transmit a green wavelength to expose the applied color filter resist. Next, (3) the color filter resist which is not exposed is removed from the rear surface S1 of the light receiving layer 15.

Figure 12A:
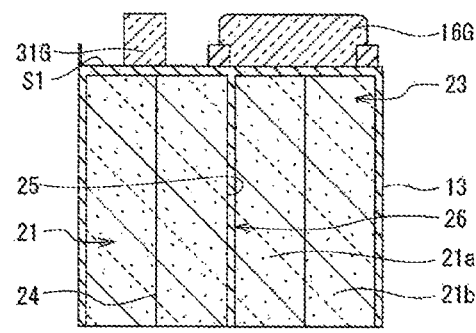
FIG. 12A is a diagram illustrating a flow of a manufacturing step for the color filter and the light-absorbing layer.

Thereby, as illustrated in FIG. 12A, the color filter 16G and the light-absorbing layer 31G which transmit a green wavelength are formed.

Figure 12B:
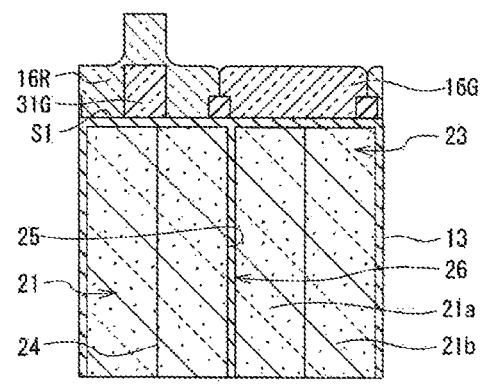
FIG. 12B is a diagram illustrating a flow of a manufacturing step for the color filter and the light-absorbing layer.
Figure 12C:
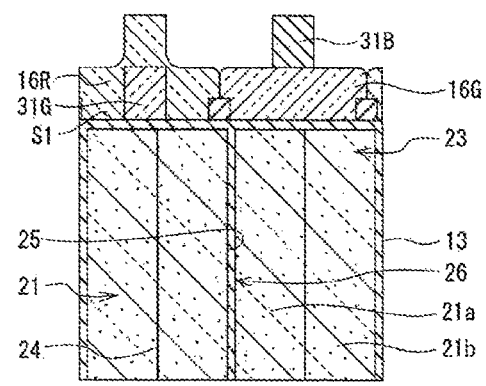
FIG. 12C is a diagram illustrating a flow of a manufacturing step for the color filter and the light-absorbing layer.

Next, the above-described steps (1) to (3) are executed using a color filter resist transmitting a red wavelength. Thereby, as illustrated in FIG. 12B, the color filter 16R transmitting a red wavelength is formed. Next, the above-described steps (1) to (3) are executed using a color filter resist transmitting a blue wavelength.

Thereby, the color filter 16 and the light-absorbing layer 31B (see FIG. 12C) which transmit a blue wavelength are formed. In this manner, when the color filter 16 is formed, the light-absorbing layer 31 formed of the same material as that of the color filter 16 is formed at the same time, and thus it is possible to reduce the number of steps as compared to a method in which a step of forming the light-absorbing layer 31 is a separate step.

Note that, as illustrated in FIG. 3A and the like, in a case where the thickness of the light-absorbing layer 31 is made smaller than the thickness of the color filter 16, it is possible to use a method of reducing the amount of a color filter resist applied, increasing the number of revolutions of a spin coater to be used for application to extend the color filter resist thinly, or reducing the viscosity of a material at a location for forming the light-absorbing layer 31.

As described above, in the solid-state imaging device 1 according to the first embodiment, the plurality of light-absorbing layers 31 which are formed between the microlenses 17 and the substrate 2 and absorb a portion of incident light 22 guided to the photoelectric conversion unit group 23 by the microlens 17 are provided. For this reason, for example, it is possible to control the amount of incident light 22 incident on the photoelectric conversion units 21 included in the same photoelectric conversion unit group 23 by adjusting the pattern shape and position of the light-absorbing layer 31 and to reduce a difference between signal charges (same color sensitivity difference) generated by the photoelectric conversion units 21. As a result, it is possible to suppress the degradation of the quality of an image obtained by remosaic processing. In addition, for example, unlike a case where a scatterer for scattering light and the inter-pixel light shielding portion 26 are used, the scattering of incident light 22 does not occur, and thus optical color mixing can be prevented. As a result, it is possible to provide the solid-state imaging device 1 capable of obtaining an image having higher image quality.

Further, in the solid-state imaging device 1 according to the first embodiment, the light-absorbing layer 31 absorbs a portion of incident light 22 having passed through the microlenses 17 so that a difference between signal charges generated by the respective photoelectric conversion units 21 included in the same photoelectric conversion unit group 23 is reduced. For this reason, for example, it is possible to reduce a difference in sensitivity between the photoelectric conversion units 21 included in the same photoelectric conversion unit group 23. For this reason, it is possible to further improve the quality of an image obtained by remosaic processing.

Figure 13:
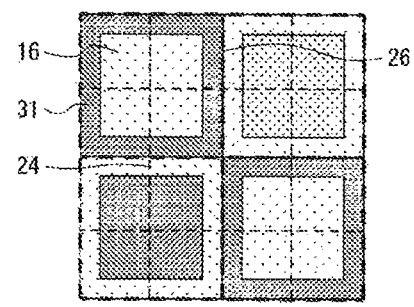
FIG. 13 is a diagram illustrating planar configurations of a color filter and a light-absorbing layer of a solid-state imaging device according to a modification example.

1-4 Modification Example (1) In the solid-state imaging device 1 according to the first embodiment, a case where the planar shape of the light-absorbing layer 31 is a rectangular shape or an elliptical shape has been described as an example. However, for example, as illustrated in FIG. 13, a configuration in which the planar shape of the light-absorbing layer 31 includes a cross shape formed by the light-absorbing layer 31 being disposed on a light path of incident light 22 incident on the surface of the impurity layer 24 (light receiving surface) on the microlens 17 side may be adopted. With a configuration in which the planar shape of the light-absorbing layer 31 includes a cross shape, it is possible to prevent oblique incident light 22 incident on one photoelectric conversion unit 21 from passing through the impurity layer 24 and being incident on other photoelectric conversion units 21 and to reduce a difference in sensitivity between the photoelectric conversion units 21 included in the same photoelectric conversion unit group 23. In addition, it is also possible to facilitate the formation of the light-absorbing layer 31.

Figure 14:
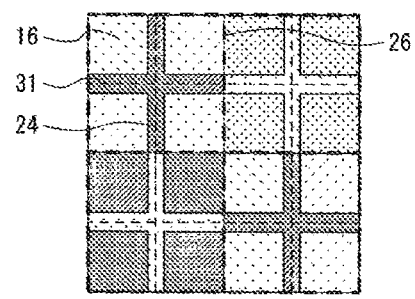
FIG. 14 is a diagram illustrating planar configurations of the color filter and the light-absorbing layer of the solid-state imaging device according to the modification example.

(2) In addition, for example, as illustrated in FIG. 14, a configuration in which the planar shape of the light-absorbing layer 31 includes a frame shape formed by the light-absorbing layer 31 being disposed on a light path of incident light 22 incident on the surface of the inter-pixel light shielding portion 26 (light receiving surface) on the microlens 17 side may be adopted. With a configuration in which the planar shape of the light-absorbing layer 31 includes a frame shape, it is possible to prevent incident light 22 from being incident on the surface of the inter-pixel light shielding portion 26 on the microlens 17 side, prevent the scattering of the incident light 22 due to the inter-pixel light shielding portion 26, and prevent noise (color mixing) from being generated in signal charges of the photoelectric conversion units 21 due to the scattered incident light 22. In addition, it is also possible to facilitate the formation of the light-absorbing layer 31.

Figure 15:
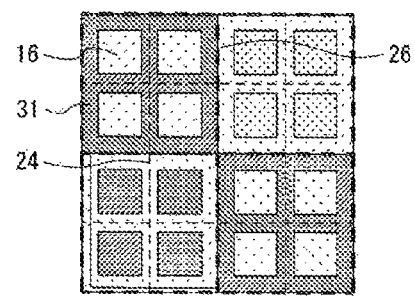
FIG. 15 is a diagram illustrating planar configurations of the color filter and the light-absorbing layer of the solid-state imaging device according to the modification example.

In addition, for example, as illustrated in FIG. 15, a configuration in which the planar shape of the light-absorbing layer 31 includes a shape in which the cross shape illustrated in FIG. 13 and the frame shape illustrated in FIG. 14 are combined may be adopted.

2. Second Embodiment: Electronic Equipment

Next, electronic equipment 100 according to a second embodiment of the present disclosure will be described. FIG. 16 is a schematic configuration diagram of the electronic equipment 100 according to the second embodiment of the present disclosure.

The electronic equipment 100 according to the second embodiment includes a solid-state imaging device 101, an optical lens 102, a shutter device 103, a driving circuit 104, and a signal processing circuit 105. In the electronic equipment 100 according to the second embodiment, an embodiment in a case where the solid-state imaging device 1 according to the first embodiment of the present disclosure is used for electronic equipment (for example, a camera) is shown as the solid-state imaging device 101.

The optical lens 102 forms an image of image light (incident light 106) from a subject on an imaging surface of the solid-state imaging device 101. Thereby, signal charges are accumulated in the solid-state imaging device 101 for a certain period. The shutter device 103 controls a light irradiation period and a light shielding period for the solid-state imaging device 101. The driving circuit 104 supplies a driving signal for controlling a transfer operation of the solid-state imaging device 101 and a shutter operation of the shutter device 103. An operation of transferring a signal to the solid-state imaging device 101 is performed by the driving signal (timing signal) supplied from the driving circuit 104. The signal processing circuit 105 performs various signal processing on signals (pixel signals) output from the solid-state imaging device 101. A video signal having been subjected to signal processing is stored in a storage medium such as a memory or is output to a monitor.

Note that the electronic equipment 100 to which the solid-state imaging device 1 can be applied is not limited to a camera, and the solid-state imaging device 1 can also be applied to other electronic equipment. The solid-state imaging device 1 may be applied to an imaging device such as a camera module for mobile equipment such as a mobile phone or a tablet terminal.

Further, in the second embodiment, a configuration in which the solid-state imaging device 1 according to the first embodiment is used in electronic equipment has been adopted as the solid-state imaging device 101, but other configurations may be adopted. For example, the solid-state imaging device 1 according to the modification example may be used in electronic equipment.

Note that the present technique can also take on the following configurations.

(1)

A solid-state imaging device including:
a pixel unit which is configured such that a plurality of unit pixels are disposed in a two-dimensional array, the plurality of unit pixels being configured to include a plurality of photoelectric conversion units and a plurality of microlenses, the plurality of photoelectric conversion units being formed on a substrate and generating signal charges corresponding to the amount of incident light, and the plurality of microlenses being configured such that one microlens is formed for one photoelectric conversion unit group among a plurality of photoelectric conversion unit groups each of which is constituted by at least two or more adjacent photoelectric conversion units insulated from each other by an impurity layer, and guiding the incident light to each of a plurality of the photoelectric conversion unit groups; and
a plurality of light-absorbing layers that are formed between the microlenses and the substrate and absorb a portion of the incident light guided to the photoelectric conversion unit groups by the microlenses.

(2)

The solid-state imaging device according to (1), wherein the light-absorbing layers absorb a portion of the incident light having passed through the microlenses so that a difference between the signal charges generated by the respective photoelectric conversion units included in the same photoelectric conversion unit group is small.

(3)

The solid-state imaging device according to (1) or (2), wherein an area of a planar shape of the light-absorbing layer is smaller than an area of a planar shape of the photoelectric conversion unit group.

(4)

The solid-state imaging device according to (3), wherein the planar shape of the light-absorbing layer is a predetermined shape in which the light-absorbing layer becomes longer in a direction parallel to a line passing through the unit pixel having the light-absorbing layer formed therein and a central portion of the pixel unit as a distance between the unit pixel and the central portion of the pixel unit increases.

(5)

The solid-state imaging device according to (4), wherein the planar shape is a rectangular shape.

(6)

The solid-state imaging device according to (4), wherein the planar shape is an elliptical shape.

(7)

The solid-state imaging device according to any one of (1) to (3), wherein a planar shape of the light-absorbing layer includes a cross shape formed by the light-absorbing layer being disposed on a light path of the incident light incident on a surface of the impurity layer on the microlens side.

(8)

The solid-state imaging device according to any one of (1) to (3), further including: an inter-pixel light shielding portion formed between the photoelectric conversion unit groups,
wherein a planar shape of the light-absorbing layer includes a frame shape formed by the light-absorbing layer being disposed on a light path of the incident light incident on a surface of the inter-pixel light shielding portion on the microlens side.

(9)

The solid-state imaging device according to any one of (1) to (8), further including: color filters provided between the photoelectric conversions unit and the microlenses,
wherein the light-absorbing layer is formed on a surface of the color filter on the microlens side or a surface thereof on the substrate side, and a material of the light-absorbing layer is the same material as that of any one color filter.

(10)

The solid-state imaging device according to (9), wherein the material of the color filter and the material of the light-absorbing layer formed in the color filter are the same.

(11)

The solid-state imaging device according to (9), wherein the material of the color filter and the material of the light-absorbing layer formed in the color filter are different.

(12)

The solid-state imaging device according to any one of (9) to (11), wherein a thickness of the light-absorbing layer is smaller than a thickness of the color filter.

(13)

The solid-state imaging device according to any one of (9) to (12), wherein a position of the light-absorbing layer with respect to the color filter when seen in a plan view becomes closer to the central portion side of the pixel unit as a distance between the unit pixel having the light-absorbing layer formed therein and the central portion of the pixel unit increases.

(14)

The solid-state imaging device according to any one of (1) to (13), wherein the microlens is configured such that a central portion of the microlens when seen in a plan view is shifted to the central portion side of the pixel unit from a center of the photoelectric conversion unit group corresponding to the microlens toward an outer peripheral portion of the pixel unit from the central portion thereof.

(15)

The solid-state imaging device according to any one of (1) to (14), further including: color filters provided between the photoelectric conversion units and the microlenses,
wherein the color filter is configured such that a central portion of the color filter when seen in a plan view is shifted to the central portion side of the pixel unit from a center of the photoelectric conversion unit group corresponding to the color filter toward an outer peripheral portion of the pixel unit from the central portion thereof.

(16)

Electronic equipment including:
a solid-state imaging device including a pixel unit and a plurality of light-absorbing layers, the pixel unit being configured such that a plurality of unit pixels are disposed in a two-dimensional array, the plurality of unit pixels being configured to include a plurality of photoelectric conversion units and a plurality of microlenses, the plurality of photoelectric conversion units being formed on a substrate and generating signal charges corresponding to the amount of incident light, and the plurality of microlenses being configured such that one microlens is formed for one photoelectric conversion unit group among a plurality of photoelectric conversion unit groups each of which is constituted by at least two or more adjacent photoelectric conversion units insulated from each other by an impurity layer, and guiding the incident light to each of a plurality of the photoelectric conversion unit groups, and the plurality of light-absorbing layers being formed between the microlenses and the substrate and absorb a portion of the incident light guided to the photoelectric conversion unit groups by the microlenses;

an optical lens which forms an image of image light from a subject on an imaging surface of the solid-state imaging device; and a signal processing circuit which performs signal processing on a signal output from the solid-state imaging device.

REFERENCE SIGNS LIST

1 Solid-state imaging device
2 Substrate
3 Pixel region
4 Vertical driving circuit
5 Column signal processing circuit
6 Horizontal driving circuit
7 Output circuit
8 Control circuit
9 Pixel
10 Pixel driving wiring
11 Vertical signal line
12 Horizontal signal line
13 Insulating film
14 Light shielding film
15 Light receiving layer
16 Color filter
17 Microlens
18 Light collecting layer
19 Wiring layer
20 Supporting substrate
21 Photoelectric conversion unit
21a Center-side photoelectric conversion unit
21b Outer periphery-side photoelectric conversion unit
22 Incident light
23 Photoelectric conversion unit group
24 Impurity layer
25 Groove portion
26 Inter-pixel light shielding portion
27 Color filter array
28 Microlens array
29 Unit pixel
30 Pixel unit
31 Light-absorbing layer
32 Light path
33 Region
34 Insulating interlayer film
35 Wiring
100 Electronic equipment
101 Solid-state imaging device
102 Optical lens
103 Shutter device
104 Driving circuit
105 Signal processing circuit
106 Incident light

The invention claimed is:

1. A solid-state imaging device, comprising:
a pixel unit that includes:
a plurality of unit pixels in a two-dimensional array, wherein each unit pixel of the plurality of unit pixels includes:
a plurality of photoelectric conversion units on a substrate; and
a plurality of microlenses, wherein
the plurality of photoelectric conversion units is configured to generate signal charges corresponding to amount of an incident light incident on the plurality of photoelectric conversion units,
one microlens, from the plurality of microlenses, is for one photoelectric conversion unit group among a plurality of photoelectric conversion unit groups,
each photoelectric conversion unit group of the plurality of photoelectric conversion unit groups consists of at least two adjacent photoelectric conversion units of the plurality of photoelectric conversion units,
each of the at least two adjacent photoelectric conversion units is inter-insulated by an impurity layer, and the plurality of microlenses is configured to guide the incident light to each of the plurality of the plurality of photoelectric conversion unit groups; and
a plurality of light-absorbing layers between the plurality of microlenses and the substrate, wherein
the plurality of light-absorbing layers is configured to absorb a portion of the incident light guided to the plurality of photoelectric conversion unit groups by the plurality of microlenses, and
each of the plurality of light-absorbing layers becomes longer in a direction parallel to a line that passes through a corresponding unit pixel of the plurality of unit pixels and a central portion of the pixel unit, as a distance between the corresponding unit pixel and the central portion of the pixel unit increases.

2. The solid-state imaging device according to claim 1, wherein an area of a planar shape of each of the plurality of light-absorbing layers is smaller than an area of a planar shape of each of the plurality of photoelectric conversion unit groups.

3. The solid-state imaging device according to claim 2, wherein the planar shape of each of the plurality of light-absorbing layers is in a specific shape.

4. The solid-state imaging device according to claim 3, wherein the planar shape is a rectangular shape.

5. The solid-state imaging device according to claim 3, wherein the planar shape is an elliptical shape.

6. The solid-state imaging device according to claim 1, wherein a planar shape of each of the plurality of light-absorbing layers includes a cross shape formed by each of the plurality of light-absorbing layers on a light path of the incident light incident on a surface of the impurity layer on a side of the plurality of microlenses.

7. The solid-state imaging device according to claim 1, further comprising:
an inter-pixel light shielding portion between the plurality of photoelectric conversion unit groups,
wherein a planar shape of each of the plurality of light-absorbing layers includes a frame shape formed by each of the plurality of light-absorbing layers on a light path of the incident light incident on a surface of the inter-pixel light shielding portion on a side of the plurality of microlenses.

8. The solid-state imaging device according to claim 1, further comprising:
 a plurality of color filters between the plurality of photoelectric conversion units and the plurality of microlenses, wherein each of the plurality of light-absorbing layers is on a surface of a corresponding color filter of the plurality of color filters on a side of the plurality of microlenses or on the surface of the corresponding color filter on a side of the substrate, and
 a material of each of the plurality of light-absorbing layers is same as a material one of the plurality of color filters.

9. The solid-state imaging device according to claim 8, wherein the material of the plurality of color filters is different from the material of each of the plurality of light-absorbing layers.

10. The solid-state imaging device according to claim 8, wherein a thickness of each of the plurality of light-absorbing layers is smaller than a thickness of the plurality of color filters.

11. The solid-state imaging device according to claim 8, wherein a position of each of the plurality of light-absorbing layers with respect to a corresponding color filter of the plurality of color filters, in a plan view, becomes closer to a side of the central portion of the pixel unit as a distance between each of the plurality of unit pixels and the central portion of the pixel unit increases.

12. The solid-state imaging device according to claim 1, wherein each of the plurality of microlenses is configured such that a central portion of each of the plurality of microlenses, in a plan view, is shifted to a side of the central portion of the pixel unit from a center of a corresponding photoelectric conversion unit group of the plurality of photoelectric conversion unit groups toward an outer peripheral portion of the pixel unit from the central portion of the pixel unit.

13. The solid-state imaging device according to claim 1, further comprising:
 a plurality of color filters between the plurality of photoelectric conversion units and the microlenses,
 wherein each of the plurality of color filters is configured such that a central portion of each of the plurality of color filters, in a plan view, is shifted to a side of the central portion of the pixel unit from a center of a corresponding photoelectric conversion unit group of the plurality of photoelectric conversion unit groups corresponding to the color filter toward an outer peripheral portion of the pixel unit from the central portion of the pixel unit.

14. An electronic equipment, comprising:
 a solid-state imaging device including:
  a pixel unit that includes:
   a plurality of unit pixels in a two-dimensional array, wherein each unit pixel of the plurality of unit pixels includes:
    a plurality of photoelectric conversion units on a substrate; and
    a plurality of microlenses, wherein
     the plurality of photoelectric conversion units is configured to generate signal charges corresponding to amount of an incident light incident on the plurality of photoelectric conversion units,
     one microlens, from the plurality of microlenses, is for one photoelectric conversion unit group among a plurality of photoelectric conversion unit groups,
     each photoelectric conversion unit group of the plurality of photoelectric conversion unit groups consists of at least two adjacent photoelectric conversion units of the plurality of photoelectric conversion units,
     each of the at least two adjacent photoelectric conversion units is inter-insulated by an impurity layer, and
     the plurality of microlenses is configured to guide the incident light to each of the plurality of photoelectric conversion unit groups; and
  a plurality of light-absorbing layers between the plurality of microlenses and the substrate, wherein
   the plurality of light-absorbing layers is configured to absorb a portion of the incident light guided to the plurality of photoelectric conversion unit groups by the plurality of microlenses, and
   each of the plurality of light-absorbing layers becomes longer in a direction parallel to a line that passes through a corresponding unit pixel of the plurality of unit pixels and a central portion of the pixel unit, as a distance between the corresponding unit pixel and the central portion of the pixel unit increases;
 an optical lens configured to form an image of the incident light from a subject on an imaging surface of the solid-state imaging device; and
 a signal processing circuit configured to execute a signal processing operation on a signal output from the solid-state imaging device.

* * * * *